US012134468B2

(12) United States Patent
Pisani et al.

(10) Patent No.: US 12,134,468 B2
(45) Date of Patent: Nov. 5, 2024

(54) HOVER-CAPABLE AIRCRAFT AND LUBRICATION METHOD FOR A MODULE OF A TRANSMISSION UNIT OF SAID AIRCRAFT

(71) Applicant: LEONARDO S.P.A., Rome (IT)

(72) Inventors: Paolo Pisani, Samarate (IT); Federico Montagna, Samarate (IT); Roberto Regonini, Samarate (IT); Daniele Podda, Samarate (IT)

(73) Assignee: LEONARDO S.P.A., Rome (IT)

( * ) Notice: Subject to any disclaimer, the term of this patent is extended or adjusted under 35 U.S.C. 154(b) by 249 days.

(21) Appl. No.: 17/789,325

(22) PCT Filed: Dec. 24, 2020

(86) PCT No.: PCT/IB2020/062437
§ 371 (c)(1),
(2) Date: Jun. 27, 2022

(87) PCT Pub. No.: WO2021/130719
PCT Pub. Date: Jul. 1, 2021

(65) Prior Publication Data
US 2023/0033330 A1 Feb. 2, 2023

(30) Foreign Application Priority Data
Dec. 27, 2019 (EP) .................................... 19219920

(51) Int. Cl.
*B64C 27/14* (2006.01)
*B64C 27/00* (2006.01)
(Continued)

(52) U.S. Cl.
CPC ............ *B64C 27/14* (2013.01); *B64C 27/006* (2013.01); *B64C 27/12* (2013.01); *B64C 27/22* (2013.01);
(Continued)

(58) Field of Classification Search
CPC ............... F16H 57/045; F16H 57/0456; F16H 57/0435; B64C 27/12; B64C 27/22
See application file for complete search history.

(56) References Cited

U.S. PATENT DOCUMENTS 4,976,335 A * 12/1990 Cappellato ................ F16N 7/40
184/7.4
10,844,948 B2 * 11/2020 De Meerschman .. F16H 57/045
(Continued)

FOREIGN PATENT DOCUMENTS

EP 0068677 A1 1/1983

OTHER PUBLICATIONS

International Search Report and Written Opinion in corresponding International Patent Application No. PCT/IB2020/062437 mailed Mar. 5, 2021 (15 pages).
(Continued)

*Primary Examiner* — Michael A Riegelman
(74) *Attorney, Agent, or Firm* — Leason Ellis LLP

(57) ABSTRACT

An aircraft is described comprising a transmission unit with a first module and a lubrication system; the first module comprises a casing and a movable member; the lubrication system comprises a header, a nozzle fed with the lubricating fluid and designed to feed the lubricating fluid inside the casing of the first module, a collection tank for the lubricating fluid injected by the nozzle, and recirculation means designed to cause the recirculation of the lubricating fluid from the collection tank to the feed header; the first module comprises a valve available in a first configuration, in which it enables the outflow of said lubricating fluid from said module to the recirculation means when the pressure of the lubricating fluid inside the header is greater than a threshold value; and in a second configuration, in which it fluidically isolates the module from the recirculation means when the
(Continued)

pressure of the lubricating fluid inside the header is less than the threshold value.

14 Claims, 7 Drawing Sheets

(51) Int. Cl.
    *B64C 27/12*     (2006.01)
    *B64C 27/22*     (2006.01)
    *F16H 57/04*     (2010.01)
    *F16K 11/07*     (2006.01)
    *F16K 31/122*     (2006.01)

(52) U.S. Cl.
    CPC ..... *F16H 57/0421* (2013.01); *F16H 57/0435* (2013.01); *F16H 57/0456* (2013.01); *F16K 11/07* (2013.01); *F16K 31/1223* (2013.01)

(56) References Cited

U.S. PATENT DOCUMENTS

| | | | | |
|---|---|---|---|---|
| 11,835,126 | B2* | 12/2023 | Deport | F16H 57/045 |
| 11,959,542 | B2* | 4/2024 | Biehler | F16H 57/0435 |
| 2005/0115770 | A1* | 6/2005 | Sandrart | F16H 57/0413 |
| | | | | 184/6.2 |
| 2010/0025159 | A1* | 2/2010 | Gmirya | F16N 17/00 |
| | | | | 184/6.4 |
| 2016/0369887 | A1* | 12/2016 | Sheridan | F16H 57/045 |
| 2017/0175875 | A1* | 6/2017 | Lapeyre | F16H 57/045 |
| 2018/0106360 | A1* | 4/2018 | Gmirya | F16H 57/0442 |
| 2019/0178366 | A1* | 6/2019 | De Meerschman | |
| | | | | F16H 57/0413 |
| 2020/0103019 | A1* | 4/2020 | Manzoni | F16H 57/045 |
| 2021/0180680 | A1* | 6/2021 | Farhat | F16H 57/0456 |
| 2022/0107018 | A1* | 4/2022 | Zamponi | F16N 7/32 |
| 2022/0112947 | A1* | 4/2022 | Vuolle-Apiala | F16H 57/0436 |
| 2023/0030818 | A1* | 2/2023 | Biehler | F16H 57/0436 |
| 2023/0033330 | A1* | 2/2023 | Pisani | B64C 27/14 |
| 2023/0323941 | A1* | 10/2023 | Deport | F16N 29/00 |
| | | | | 184/6 |

OTHER PUBLICATIONS

International Preliminary Report on Patentability in corresponding International Patent Application No. PCT/IB2020/062437 mailed Mar. 22, 2022 (9 pages).

Written Opinion of the International Preliminary Examining Authority in corresponding International Patent Application No. PCT/IB2020/062437 mailed Apr. 16, 2021 (6 pages).

* cited by examiner

HOVER-CAPABLE AIRCRAFT AND LUBRICATION METHOD FOR A MODULE OF A TRANSMISSION UNIT OF SAID AIRCRAFT

CROSS-REFERENCE TO RELATED APPLICATIONS

This patent application is a U.S. National Phase Application under 35 U.S.C. § 371 of International Patent Application No. PCT/IB2020/062437, filed on Dec. 24, 2020, which claims priority from European patent application no. 19219920.6, filed on Dec. 27, 2019 the entire disclosure of which is incorporated herein by reference.

TECHNICAL FIELD

The present invention relates to a hover-capable aircraft, in particular a convertiplane or a helicopter.

The present invention also relates to a method of lubricating a module of a transmission unit of a hover-capable aircraft.

BACKGROUND ART

As is known, helicopters are usually fitted with a transmission unit, which is designed to transmit the driving force from one or more turbines to the main and/or tail rotors, and/or from the turbine to a plurality of auxiliary devices, i.e. intended, for example, to provide the power necessary for operation of the flight instruments.

The transmission unit, in turn, comprises a plurality of movable members coupled to each other, including a plurality of gears.

In a known manner, a lubricating fluid, typically oil, circulates inside the transmission unit, both for lubricating the movable members of the transmission unit and for cooling the aforesaid movable members.

The transmission unit comprises:
a plurality of mutually consecutive stages; and
a lubrication system designed to lubricate the movable members and certain areas to be lubricated of the aforementioned modules.

In greater detail, each pair of gears forms a corresponding stage of the transmission unit.

The transmission unit, in turn, comprises:
a casing defining a housing shell; and
one or more stages housed inside the casing.

According to a first solution, known as "splash lubrication", the module is filled with lubricating oil up to a certain level. The lubricating oil partially covers the gears. Consequently, operation of the gears projects the lubricating oil towards the areas of the module to be lubricated.

According to a further solution, known as "force-feed lubrication", the lubrication system comprises a recirculation circuit conveying the lubricating oil to and from the casing of each module.

The recirculation circuit, in turn, comprises:
a collection header for the lubricating oil;
a plurality of nozzles fed with lubricating oil by a pump and designed to inject the lubricating oil under pressure into the areas of the module to be lubricated; and
a delivery pump that sucks in and pressurizes the lubricating oil injected by the nozzles and recirculates it to the nozzles.

The "force-feed lubrication" solutions can, in turn, be of the wet-sump or dry-sump type.

In the wet-sump solution, the casings of the modules define respective collection tanks for the lubricating oil injected by the nozzles. The delivery pump sucks up this lubricating oil from the tanks of the casings.

In the dry-sump solution, the lubrication system comprises:
a further pump, indicated as the recovery pump, common to all the modules; and
a tank common to all the modules, separate from the casing of the modules and fluidically connected to the aforementioned casings.

The recovery pump sucks up lubricating oil from the casings and makes it available in the common tank.

The delivery pump sucks up lubricating oil from this common tank, separate from the casings, and transfers it to the common header.

In both of the above-described solutions, there is the risk that the pressure of the lubricating oil drops below a threshold level, for example, in the event of failure of the lubrication system.

In such circumstances, the risk arises of hindering correct operation of the transmission unit and worsening the operational capability of the helicopter.

There is therefore awareness in the industry of the need to preserve a certain level of operation of the modules of the transmission unit, even in the event of failure of the lubrication system.

There is also awareness in the industry of the need to promptly identify and signal a failure condition of the lubrication system.

EP-A-0068677 discloses a helicopter transmission system with a gearbox comprising a gearcase having a hollow stub axle by which operational loads are transmitted from a main sustaining rotor to a fuselage structure. One or more input speed reducing gear trains are individually supported in hollow lobe portion(s) supported from the axle, the or each lobe portion having an individual lubricating oil sump and circulating means adapted to circulate lubricating oil to the respective gear trains. Preferably, interconnecting means are provided to connect the respective individual sumps, and valve means are adapted to maintain a flow of lubricating oil in the event of a loss of oil from one of the sumps. US2018/106360 discloses a hover-capable aircraft.

DISCLOSURE OF INVENTION

The object of the present invention is the production of a hover-capable aircraft that enables satisfying at least one of the aforementioned needs is a simple and inexpensive manner.

The aforesaid object is achieved by the present invention, in so far as it relates to a hover-capable aircraft as described and illustrated herein and as set forth in the claims.

The present invention also relates to a method of lubricating a module of a transmission unit of a hover-capable aircraft.

BRIEF DESCRIPTION OF THE DRAWINGS

For a better understanding of the present invention two preferred embodiments are described hereinafter, purely by way of non-limitative example and with reference to the accompanying drawings, in which.

BEST MODE FOR CARRYING OUT THE INVENTION

Figure 1:
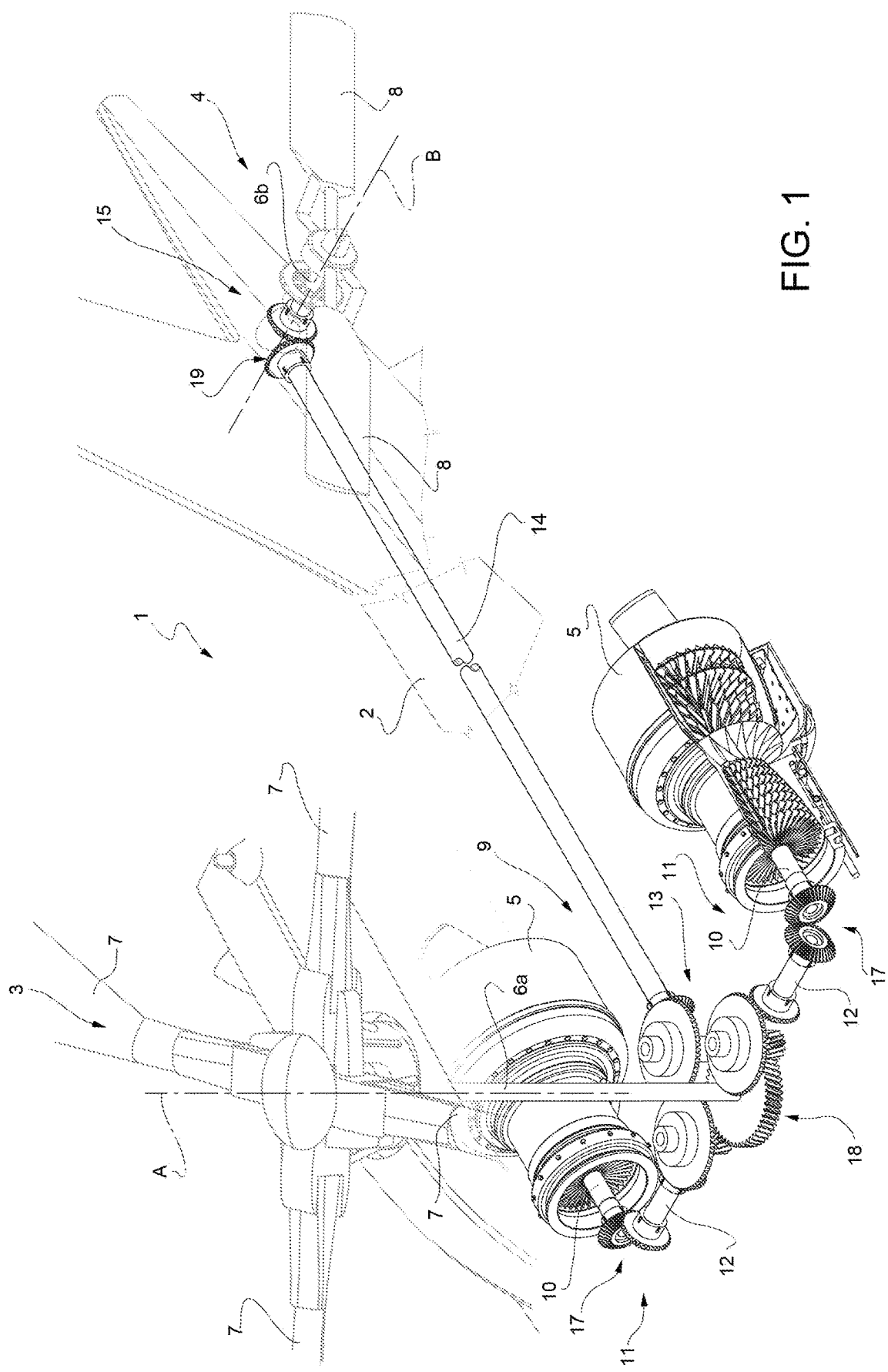
FIG. 1 is a perspective view of a hover-capable aircraft made according to the dictates of the present invention, with parts removed for the sake of clarity.

With reference to FIG. 1, reference numeral 1 indicates a helicopter, basically comprising:
a fuselage 2;
one or more turbines 5 equipped with respective output shafts 10;
a main rotor 3 located on the top of the fuselage 2 and rotatable about an axis A; and
an anti-torque rotor 4 located at a tail end of the fuselage 2 and rotatable about its axis B, transversal to the axis A.

Each rotor 3, 4, in turn, comprises a respective mast 6a, 6b on which respective blades 7, 8 are hinged.

The helicopter 1 further comprises a transmission unit 9, in itself known, which transmits motive power from the turbines 5 to the masts 6a, 6b to allow operation of the respective rotors 3, 4.

The transmission unit 9, in turn, comprises a plurality of movable members, in particular gears, which are interposed between the turbines 5 and the masts 6a, 6b.

The transmission unit 9 further comprises a plurality of stages, each formed by a relative pair of the aforementioned gears meshing with each other.

The transmission unit 9 further comprises:
a pair of input gears 17, which transmit motion from respective output shafts 10 to respective countershafts 12; and
a main gear train 18, which transmits motion from the countershafts 12 to the mast 6a.

The transmission unit 9 further comprises:
a countershaft 14 driven by the gear train 18; and
a pair of gears 19, which transmit motion from the countershaft 14 to the mast 6b of the rotor 4.

The pairs of gears 17, 19 meshing with each other and the gear train 18 form respective stages of the transmission unit 9.

The transmission unit 9 further comprises a plurality of the modules 11, 13, 15.

Each module 11, 13, 15 basically comprises (FIG. 2):
one or more pairs of respective gears 17, 19 and the gear train 18 meshing with each other;
a casing 20 (only schematically shown) for housing the relative pair of gears 17, 19 and the gear train 18.

Figure 2:
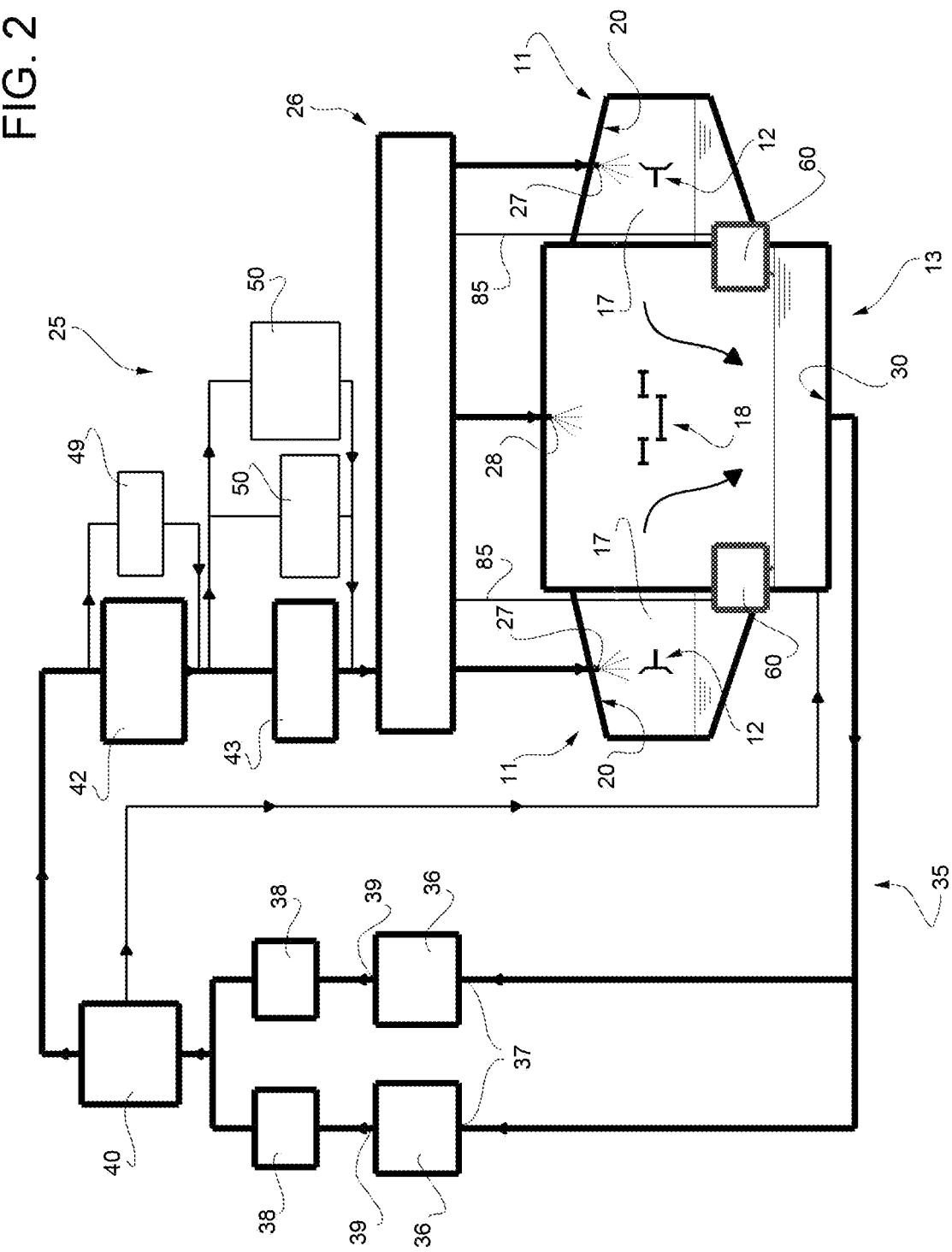
FIG. 2 is a functional diagram of a first embodiment of a lubrication system incorporated in a transmission unit of the helicopter of FIG. 1.

With reference to FIG. 2, the helicopter 1 further comprises a lubrication system 25 designed to convey lubricating oil to certain areas of the transmission unit 9.

In the case shown in FIG. 2, the lubrication system 25 is of the wet-sump forced-recirculation type.

The lubrication system 25 basically comprises:
a feed header 26 for the lubricating oil;
a plurality of nozzles 27, 28 fluidically connected to the header 26 and designed to inject lubricating oil on the areas to be lubricated of the respective modules 11, 13, 15 and inside the respective casings 20; and
a collection sump 30 for the lubricating oil injected from the nozzles 27, 28 inside the respective modules 11, 13, 15.

The header 26 and the sump 30 are common to the modules 11, 13, 15.

The sump 30 is also integral with the casings 20 of the modules 11, 13, 15.

The lubrication system 25 further comprises a recirculation circuit 35 for conveying the lubricating oil from the sump 30 to the header 26.

The recirculation circuit 35, in turn, comprises:
a pair of pumps 36 having respective inlet ports 37 fluidically connected to the sump 30;
a pair of non-return valves 38 fluidically connected to respective discharge ports 39 of respective pumps 36;
one or more drain valves 40 connected to the non-return valves 38 and to the header 26;
a filter 42 connected to the drain valve 40; and
a cooler 43 interposed between the filter 42 and the header 26.

The recirculation circuit 35 further comprises:
a bypass valve 49 fluidically interposed between the drain valve 40 and the cooler 43, bypassing the filter 42; and
a thermostatic bypass valve 50 interposed between the filter 42 and the header 26, bypassing the cooler 43.

As modules 11 are identical to each other, hereinafter in this description will make reference to only one module 11.

Advantageously, module 11 comprises a valve 60 available:
in a first configuration (FIG. 3) wherein it allows the outflow of lubricating oil from the module 11 to the recirculation circuit 35 when the pressure of the lubricating oil inside the header 26 is greater than a threshold value; and
in a second configuration (FIG. 4) wherein it fluidically isolates the module 11 from the recirculation circuit 35 and allows keeping the lubricating fluid inside the casing 20 when the pressure of the lubricating oil inside the casing 20 is less than a threshold value.

In greater detail, the lubricating oil is normally present inside the header 26 at a pressure higher than the threshold value, so as to keep the valve 60 in the first configuration.

Contrariwise, when the pressure of the lubricating fluid drops to a value below the threshold value, for example in the event of failure of the lubrication system 25, the valve 60 moves from the first configuration to the second configuration.

When the valve 60 is arranged in the second configuration (FIG. 4), the casing 20 of the module 11 becomes substantially sealed and the level of lubricating oil inside the casing 20 remains substantially constant, thereby preserving lubrication of the module 11 due to the fact that the lubricating oil is projected towards the areas to be lubricated by the gears 17 contained in module 11.

In other words, in the event of failure of the lubrication system 25, the arrangement of the valve 60 in the second configuration causes the passage from force-feed lubrication of the casing 20 to a splash lubrication of the casing 20.

In the embodiment shown, the valve 60 is of the automatic type, i.e. it does not have external control members.

More specifically, the valve 60 automatically moves from the first to the second configuration, according to the pressure inside the header 26.

Figure 3:
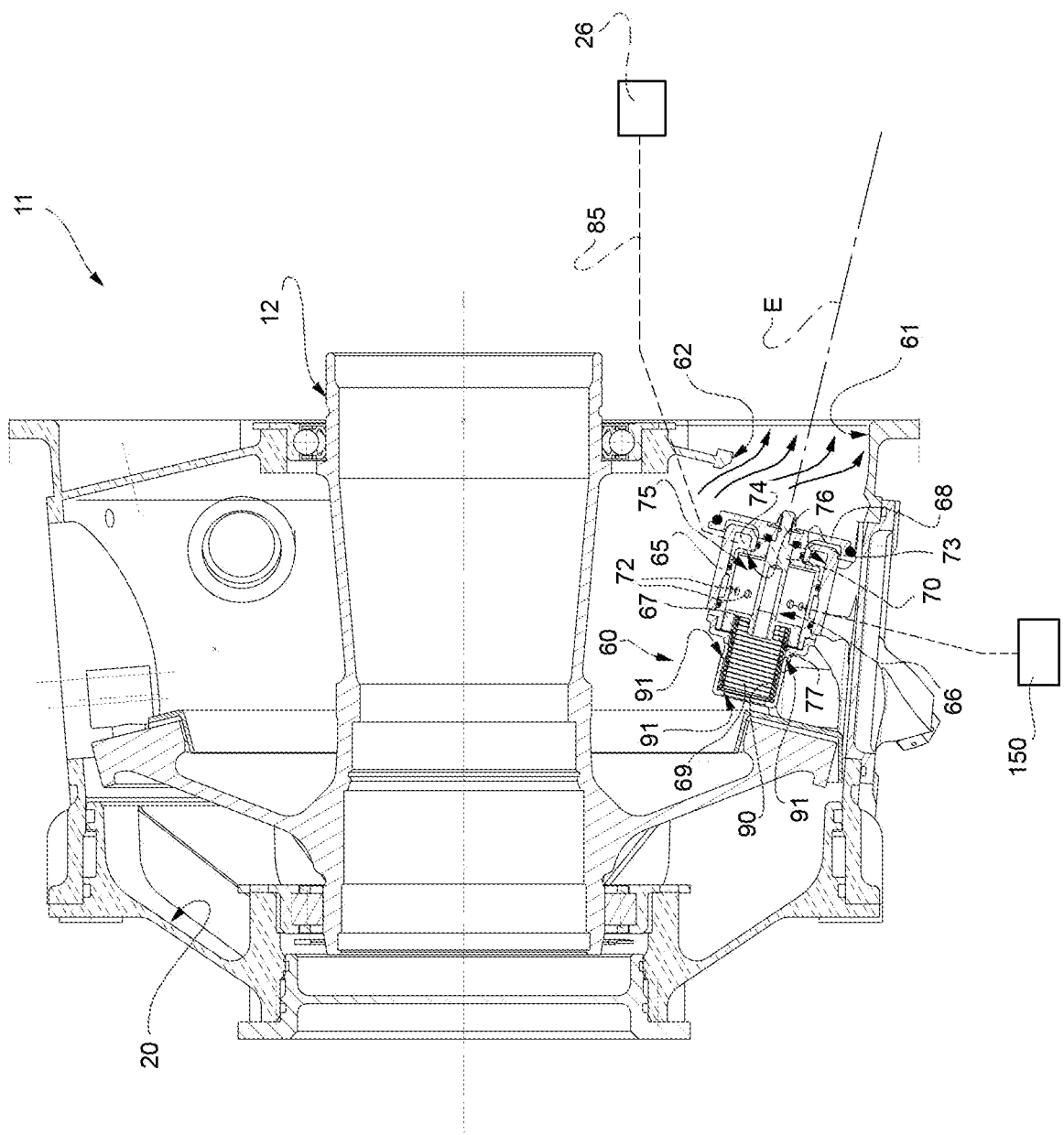
FIGS. 3 and 4 show a valve of the lubrication system of FIG. 2 in section, with parts removed for the sake of clarity, in respective operating configurations.
Figure 4:
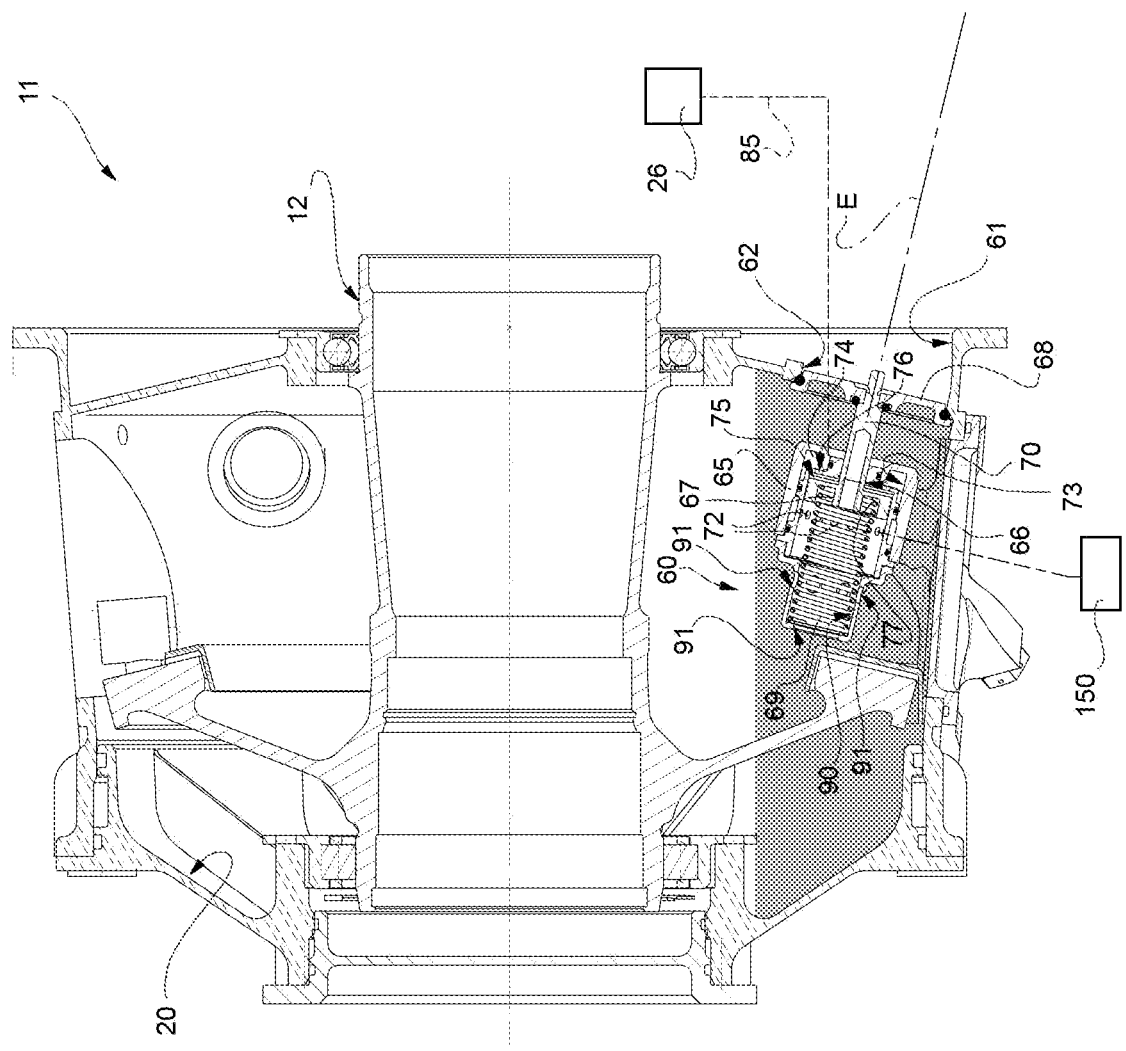

With reference to FIGS. 3 and 4, the casing 20 comprises:
- a lower portion 61 inside which the lubricating oil injected by the nozzles 27 is collected and which houses the valve 60; and
- an opening 62 fluidically connected to the sump 30 (not shown in FIG. 3) and to the lower portion 61.

In the case shown, the opening 62 is circular.

The valve 60 basically comprises:
- a shell 65 fixed to the lower portion 61 of the casing 20;
- a plunger 66 sliding inside the shell 65 along its axis E between a first position (FIG. 3) and a second position (FIG. 4); and
- a spring 69 interposed between the shell 65 and the plunger 66 and designed to elastically push the plunger 66 towards the second position.

In the case shown, the spring 69 is of the helical type.

The plunger 66 comprises respective axial ends 67, 68 opposite to each other and a stem 70 axially interposed between the ends 67, 68.

The end 68 is shaped like a flange radially projecting in a cantilever fashion from the stem 70, with a diameter larger than the stem 70 and corresponding to the diameter of the opening 62.

The plunger 66 further comprises a flange 77 adjacent to end 67 and with a diameter larger than the stem 70.

The valve 60 further comprises:
- a chamber 74 delimited by the shell 65 and fluidically connected to the header 26 by a fluid line 85 (FIG. 2); and
- a chamber 75 fluidically connected to chamber 74 by a plurality of openings 76.

The chamber 75 is delimited by the shell 65 and by the flange 77 of the plunger 66 and therefore has a variable volume depending on the position of the plunger 66 along the axis E.

In the case shown, the openings 76 are axially and angularly equispaced around the axis E.

The valve 60 further comprises a plurality of openings 72 made in the shell 65.

The openings 72 are angularly equispaced around the axis E.

The end 67 touches the spring 69 and the end 68 is housed inside the lower portion 61.

The plunger 66 is subjected to opposing forces generated by the spring 69 acting on the end 67 and by the pressure of the lubricating oil inside the chamber 75 on the flange 77. This pressure is equal to the pressure inside the header 26.

The valve 60 is configured in such a way that:
- the action of the pressure of the lubricating oil on the flange 77 is such as to overcome the elastic action of the spring 69 when the pressure is higher than the threshold value, so as to move the valve 60 to the first configuration and the plunger 66 to the first position (FIG. 3); and
- the action of the pressure of the lubricating oil on the end 67 is not sufficient to overcome the elastic action of the spring 69 when the pressure is lower than the threshold value, so as to move the valve 60 to the second configuration and the plunger 66 to the second position (FIG. 4).

In particular, when the plunger 66 is in the first position, the end 68 is spaced from the opening 62, through which the lubricating oil continues to flow from the casing 20 to the sump 30.

When the plunger 66 is in the second position, the end 68 abuts against and seals the opening 62, preventing the flow of the lubricating oil through the opening 62.

When the plunger 66 is in the first position and the valve 60 is in the first configuration (FIG. 3), the openings 72 are interposed along the axis E between the flange 77 and the chamber 74. In this way, chamber 75 is in fluidic communication with the openings 72.

Contrariwise, when the plunger 66 is in the second position and the valve 60 is in the second configuration (FIG. 4), the flange 77 is interposed along the axis E between the openings 72 and the chambers 74, 75.

In this way, the chamber 75 is fluidically isolated from the openings 72.

The chamber 75 has a larger volume when the plunger 66 is in the first position of FIG. 3, and a smaller volume when the plunger 66 is in the second position of FIG. 4.

The shell 65 further comprises a chamber 90 housing the spring 69 and in fluidic communication with the lower portion 61 of the casing 20 through a plurality of openings 91 made in the shell 65.

In this way, the lubricating oil inside the chamber 90 is at the same pressure as the lubricating oil inside the lower portion 61 of the casing 20. Consequently, the resultant force on the plunger 66 from the pressure of the lubricating oil contained in the chamber 90 and acting on the end 68 is null.

The chamber 90 is in fluidic communication with the openings 72 when the plunger 66 is in the second position shown in FIG. 4.

The lubrication system 25 comprises a pressure sensor 150 designed to detect the pressure inside the openings 72 of the shell 65.

When the valve 60 is arranged in the second configuration and the plunger 66 is in the second position (FIG. 4), the openings 72 are fluidically isolated from the chamber 75 and fluidically connected to the casing 20.

The pressure sensor 150 detects a pressure value of the lubricating oil below the threshold value and equal to the pressure of the lubricating oil in the casing 20 and, therefore, substantially null.

Contrariwise, when the valve 60 is arranged in the first configuration and the plunger 66 is in the first position (FIG. 3), the openings 72 are fluidically connected to the chamber 75. Consequently, the pressure sensor 150 detects a pressure value higher than the threshold value and equal to the pressure value in the chamber 75 and, therefore, in the header 26.

In this way, the pressure reading provided by the pressure sensor 150 provides a clear indication of whether:
- the valve 60 is in the second configuration and that it is therefore advisable to quickly land the helicopter 1; or
- the valve 60 is in the first configuration and the lubrication system 15 is operating correctly.

In the case shown, the module 13 does not comprise the valve 60.

In use, the turbines 5 drive the masts 6a, 6b of the respective rotors 3, 4 in rotation through the transmission unit 9.

In greater detail, the gears 17 of the modules 11 transmit motion from the output shafts 10 of the respective turbines 5 to the countershafts 12, the gears 18 of the main module 13 transmit motion from the countershafts 12 to the mast 6a, and the gears 19 of the module 15 transmit motion from the countershaft 14 to the mast 6b.

The lubrication system 25 ensures the correct lubrication of the modules 11, 13, 15 and the respective gears or gear trains 17, 18, 19.

In greater detail, the lubricating oil contained in the header 26 is conveyed to the nozzles 27, 28 and injected by these onto the areas to be lubricated of the modules 11, 13 and 15 and inside the respective casings 20.

In addition, lubricating oil flows from the header 26 to the chambers 74, 75 of the valve 60 through the fluid line 85.

This lubricating oil is then collected in the sump 30 and, through the recirculation circuit 35, conveyed again to the header 26.

More specifically, the pumps 36 suck the lubricating oil from the sump 30, and pump it to the non-return valves 38, the drain valve 40, the filter 42 and the cooler 43.

Operation of the lubrication system 25 is described below only in relation to the modules 11 and starting from a condition in which the pressure of the lubricating oil is greater than the threshold value.

This condition substantially corresponds to a condition of normal and correct operation of the lubrication system 25.

In this condition, the valve 60 is in the first configuration and the plunger 66 is in the first position (FIG. 3). The header 26 is also fluidically connected to the chamber 74 and, through the openings 76, to the chamber 75.

In this condition, the pressure exerted by the lubricating oil inside the chamber 75 acts on the flange 77 of the plunger 66 and overcomes the action of the spring 69 on the end 67.

Furthermore, the openings 72 are interposed along the axis E between the flange 77 and the chambers 74, 75. The openings 72 are thus fluidically connected to the chambers 74, 75. Therefore, the plunger 66 leaves the opening 62 open, allowing the lubricating oil to flow from the casing 20 to the sump 30.

In the case of a drop in pressure of the lubricating oil inside the header 26 and the chamber 75 below the threshold value, for example due to failure of the lubrication system 25, the valve 60 automatically moves to the second configuration and the plunger 66 automatically moves to the second position (FIG. 4) in which it closes and seals the opening 62.

This happens because the elastic force of the spring 69 on the end 67 exceeds the force exerted by the pressure of the lubricating oil in the chamber 75 on the flange 77 of the plunger 66, pushing the latter to the second position.

In this condition, the flange 77 is axially interposed along the axis E between the openings 72 and the chambers 74, 75. The openings 72 are thus fluidically isolated from the chamber 74.

At this point, the lubricating oil remains trapped inside the casing 20 of the module 11 and defines an oil bath that at least partially submerges the gears 17.

Operation of the gears 17 projects lubricating oil toward the areas to be lubricated of the module 11, effectively implementing splash lubrication.

The pressure sensor 150 detects the pressure at the openings 72 and enables constant monitoring of whether the valve 60 is in the first or second configuration.

Figure 5:
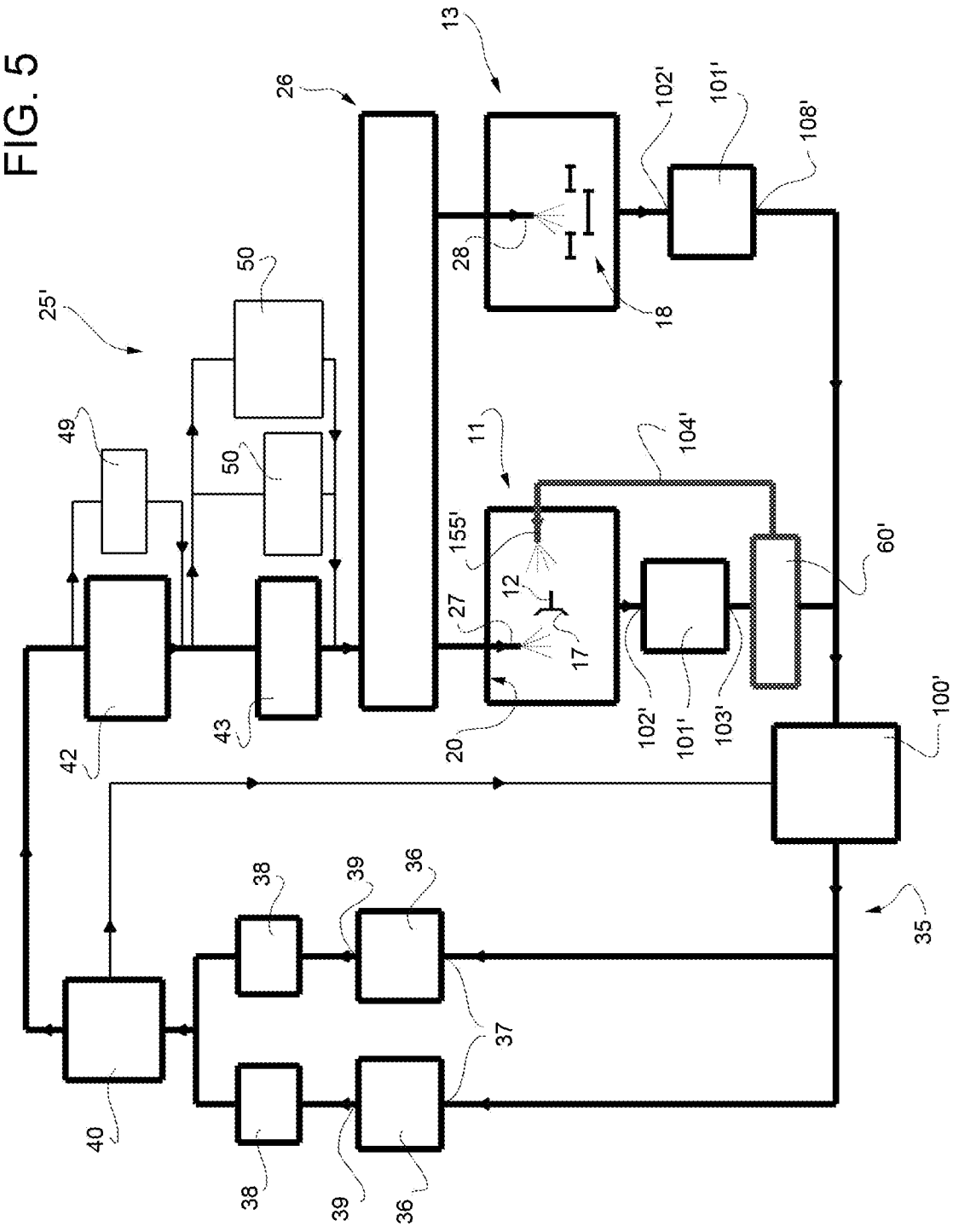
FIG. 5 is a functional diagram of a second embodiment of a lubrication system incorporated in the helicopter of FIG. 1.
Figure 6:
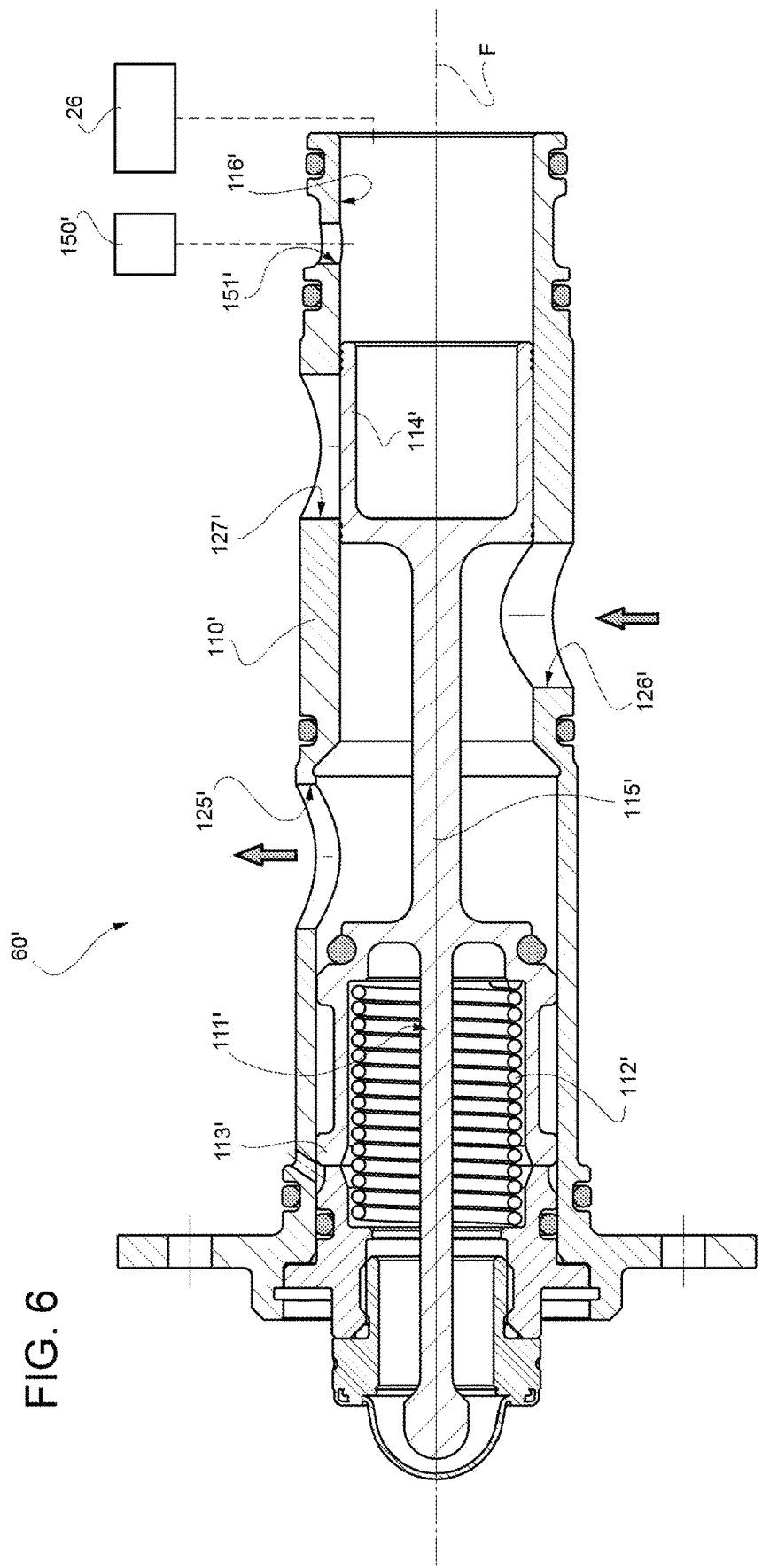
FIGS. 6 and 7 are longitudinal section views of a valve of the lubrication system of FIG. 5, with parts removed for the sake of clarity.
Figure 7:
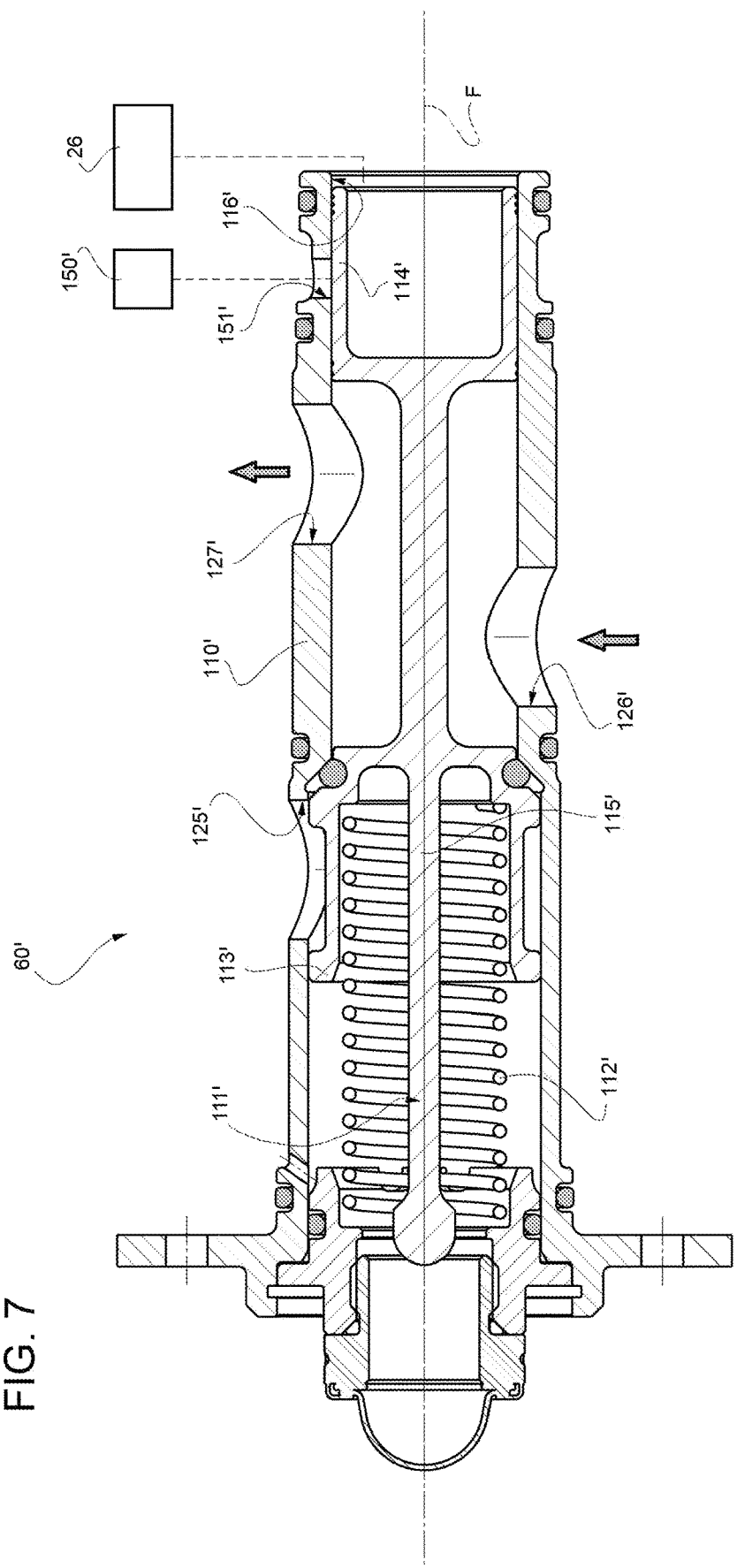

With reference to FIGS. 5 to 7, reference numeral 25' indicates a lubrication system 25 according to a further embodiment of the invention.

The lubrication system 25' is similar to the lubrication system 25 and will be described hereinafter only with regard to the differences; where possible, the same or equivalent parts of the lubrication systems 25, 25' will be indicated with the same reference numerals.

In particular, the lubrication system 25' differs from the lubrication system 25 in that it is a dry-sump, forced-recirculation lubrication system.

The lubrication system 25' also differs from the lubrication system 25 in that it comprises:
a tank 100' common to the modules 11, 13, 15, fluidically isolated from the casing 20 of these modules 11, 13, 15 and fluidically interposed between the aforementioned casing 20 and the pumps 36;
a plurality of recovery pumps 101' associated with respective stages 11, 13, 15, and having respective inlet ports 102' fluidically connected to the respective casings 20 and a plurality of discharge ports 103' fluidically connected to the tank 100'; and
a fluid line 104' interposed between the valves 60' of the module 11 and a nozzle 155' of the module 11.

In the case shown, the tank 100' is fluidically separate from the casing 20, in particular arranged externally to the casing 20.

Alternatively, the tank 100' could be arranged inside the casing 20, yet still remain fluidically distinct from it.

The lubrication system 25' differs from the lubrication system 25 in that:
the valve 60' associated with the module 11 is arranged externally to the casing 20; and
the valve 60' of the module 11 is a three-way valve fluidically connected to the discharge port 103', the tank 100' and the casing 20 associated with the same module 11.

In greater detail, when it is arranged in the first configuration (FIG. 6), the valve 60' fluidically connects the discharge port 103' of the recovery pump 101' of the module 11 to the tank 100', and fluidically isolates the discharge port 103' of the module 11 and the fluid line 104'.

Contrariwise, when it is arranged in the second configuration (FIG. 7), the valve 60' fluidically isolates the discharge port 103' of the recovery pump 101' from the tank 100', and fluidically connects the discharge port 103' to the fluid line 104', and consequently to the casing 20.

With reference to FIGS. 6 and 7, the valve 60' comprises:
a shell 110';
a plunger 111' sliding inside the shell 110' along its axis F between a first position (FIG. 6) and a second position (FIG. 7); and
a spring 112' interposed between the shell 110' and the plunger 111' and designed to elastically push the plunger 111' towards the first position.

In the case shown, the spring 112' is of the helical type.
The plunger 111' comprises:
two enlargements 113', 114' axially opposite to each other and sliding in a sealed manner inside the shell 110'; and
a stem 115', which axially connects the enlargements 113', 114' and has a smaller diameter than the shell 110'.

In particular, the enlargement 113' touches the spring 112'. The enlargement 114' and the shell 110' define a chamber 116'. The chamber 116' is axially open on the opposite side of the enlargement 114' and is fluidically connected to the header 26.

Consequently, the enlargement 114' is subjected to the pressure of the lubricating oil inside the header 26.

The action of this pressure pushes the plunger 111' toward the first position (FIG. 6).

In particular, in the first position of the plunger 111' of FIG. 6, the spring 112' is compressed. Contrariwise, in the second position of the plunger 111' in FIG. 7, the spring 112' is extended.

The shell 110' comprises three openings 125', 126', 127', which are through openings in a radial direction to the axis F and are axially staggered from each other.

More specifically, the opening 125' is fluidically connected to the tank 100', the opening 126' is fluidically connected to the recovery pump 101' and the opening 127' is fluidically connected to the fluid line 104'.

In the case shown, the opening 126' is diametrically opposite to the openings 125', 127'.

In this way, the plunger 111' is subjected to the opposing forces generated by the spring 112' and by the pressure of the lubricating oil inside the header 26.

The valve 60' is sized so that when the pressure is greater than the threshold value, the force generated on the enlargement 114 is such as to overcome the elastic action of the spring 112'. In this situation, the enlargement 114' blocks the opening 127' and the plunger 111' leaves the openings 125', 126' open (FIG. 6). In this condition, the valve 60' is arranged in the first configuration and the plunger 111' in the first position (FIG. 6).

Contrariwise, when the pressure of the lubricating oil is less than the threshold value, the elastic action of the spring 112' exceeds the action exerted on the enlargement 114' by the pressure of the lubricating oil. In this condition, the enlargement 113' blocks the opening 125' and the plunger 111' leaves the openings 126', 127' open (FIG. 7). Consequently, the valve 60' is arranged in the second configuration and the plunger 111' in the second position (FIG. 7).

In a similar manner to the lubrication system 25, the lubrication system 25' comprises a pressure sensor 150' designed to detect the pressure inside an opening 151' of the shell 110'.

In greater detail, the opening 151' is a through opening in a radial direction to the axis F and is axially staggered with respect to the openings 125', 126', 127'.

When the valve 60' is arranged in the second configuration and the plunger 111' is in the second position (FIG. 7), the enlargement 114' blocks the opening 151'.

Consequently, the pressure sensor 150' detects a substantially null pressure value.

Contrariwise, when the valve 60' is arranged in the first configuration and the plunger 111' is in the first position (FIG. 6), the enlargement 114' leaves the opening 127' open, which is in fluidic communication with the chamber 116' and, therefore, with the header 26.

Consequently, the pressure sensor 150' detects a pressure value substantially equal to that of the lubricating oil in the header 26.

In this way, the pressure reading provided by the pressure sensor 150' provides a clear indication of whether:

the valve 60' is in the second configuration and that it is therefore advisable to quickly land the helicopter 1; or
the valve 60' is in the first configuration and the lubrication system 15 is operating correctly.

In the case shown, the modules 13, 15 do not comprise the valve 60'.

The operation of the lubrication system 25' differs from that of the lubrication system 25 in that when the pressure of the lubricating oil is greater than the threshold value, the recovery pump 101' sucks lubricating oil from the casing 20 and conveys it to the tank 100'.

In this condition, the valve 60' is arranged in the first configuration, wherein it fluidically connects the recovery pump 101' to the tank 100' and fluidically isolates the recovery pump 101' from the fluid line 104'.

More specifically (FIG. 6), the action of the pressure of the lubricating oil on the enlargement 114' is such as to overcome the elastic action of the spring 112'.

Consequently, the enlargement 114' blocks the opening 127' and the plunger 111' leaves the openings 125', 126' open (FIG. 6).

Contrariwise, when the pressure of the lubricating oil in the header 26 is less than the threshold value, for example due to failure of the lubrication system 25', the valve 60' automatically moves to the second configuration. In this second configuration (FIG. 7), the valve 60' fluidically connects the recovery pump 101' to the fluid line 104' and fluidically isolates the recovery pump 101' from the tank 100'.

Consequently, the lubricating oil reaches the nozzle 155', which then injects it inside the casing 20 again, ensuring the lubrication of the module 11 even when the pressure of the lubricating oil is less than the threshold value.

In greater detail (FIG. 7), the elastic action of the spring 112' overcomes the action of the pressure of the lubricating oil on the enlargement 114'. In this condition, the enlargement 113' blocks the opening 125' and the plunger 111' leaves the openings 126', 127' open.

The pressure sensor 150' detects the pressure at the opening 151' and enables constant monitoring of whether the valve 60' is in the first or the second configuration.

From an examination of the characteristics of the helicopter 1 and the lubrication method according to the present invention, the advantages that can be attained therewith are evident.

In particular, the valve 60, 60' of the modules 11 is arranged in the first/second configuration (FIGS. 3, 4, 6 and 7) when the pressure of the lubricating oil inside the header 26 is greater/less than the threshold value.

Consequently, in the event of failure of the lubrication system 25, 25' that results in a drop in pressure of the lubricating oil, the valves 60, 60' prevent the return of lubricating oil to the pumps 36 and keep the lubricating oil inside the casing 20.

In this way, in the event of failure of the lubrication system 25, 25', the gears 17 contained inside the module 11 remain immersed in a bath of lubricating oil and, due to their movement, project this lubricating oil towards the areas to be lubricated.

In other words, the movement of the valves 60, 60' to the respective second configurations "seals" the module 11, preventing the outflow of the lubricating oil and effectively implementing a splash lubrication of the module 11.

As they are automatic, the valves 60, 60' move to the relative second configurations as soon as the pressure value inside the header 26 drops below the threshold value, in a repeatable and efficient manner and without requiring expensive dedicated controls.

The sensor 150 is operatively connected to the openings 72 and detects the pressure value at these openings 72, and provides a signal indicating whether the valve 60 is in the first or second configuration.

Similarly, the pressure sensor 150' is operatively connected to opening 155' of the valve 60' and provides a signal indicating whether the valve 60' is in the first or second configuration.

In this way, the reading provided by the pressure sensor 150, 150' when the valve 60, 60' is in the second configuration clearly indicates a drop in pressure of the lubricating oil and a consequent failure of the lubrication system 25, 25'.

This warns the pilot to land quickly.

Contrariwise, the reading provided by the pressure sensor 150' when the valve 60' is in the first configuration indicates the pressure inside the header 26 and that the lubrication system 25' is operating correctly.

Finally, it is clear that modifications and variants can be made to the helicopter 1 and to the lubrication method described and illustrated herein without departing from the scope defined in the claims.

In particular, the aircraft 1' could be a convertiplane, instead of a helicopter.

The modules 13, 15 could also comprise the valves 60, 60'.

Finally, the pressure sensor 150, 150' could be replaced by a pressure switch designed to generate a first signal when a pressure greater than the threshold value is detected and a second signal when a pressure less than the threshold value is detected.

The invention claimed is:

1. A hover-capable aircraft, comprising:
a motion transmission unit formed by at least a first module; and
a lubrication system designed to lubricate said transmission unit;
said first module, in turn, comprising:
a casing; and
one or more movable members housed inside said casing;
said lubrication system comprising:
a feed header of said lubricating fluid;
at least one nozzle fluidically feedable with said lubricating fluid from said feed header and designed to feed the lubricating fluid inside said casing of said first module so as to enable the lubrication of the relative said movable members;
a collection tank for said lubricating fluid injected by said nozzle; and
recirculation means designed to cause the recirculation of said lubricating fluid of said collection tank to said feed header;
characterized in that at least said first module comprises a valve available in a first configuration, wherein the outflow of said lubricating fluid from said module to said recirculation means is enabled when the pressure of said lubricating fluid inside said feed header is greater than a threshold value;
said valve being available in a second configuration, wherein said valve fluidically isolates said module from said recirculation means and enables keeping said lubricating fluid inside said casing when the pressure of said lubricating fluid inside said feed header is less than said threshold value.

2. The aircraft according to claim 1, characterized in that said valve is automatic and the movement of said valve between said first and second configurations is automatically determined by the value of said pressure inside said feed header.

3. The aircraft according to claim 2, characterized in that said valve, in turn, comprises:
a shell fixed with respect to said casing;
a plunger sliding inside said shell between a first position and a second position corresponding to said first configuration and said second configuration, respectively;
elastic means interposed between said shell and said plunger and designed to elastically push said plunger towards said second position; and
a chamber defined between said shell and said plunger, and fluidically connected to said feed header and configured so as to exert an action on said plunger opposite to the one exerted by said elastic means and directed, in use, towards said first position.

4. The aircraft according to claim 1, characterized in that said transmission unit comprises at least a second module;
said feed header being common to said first and second modules;
said tank being a sump shared between said first and second modules, defined by said casing of at least one of said first and second modules, and designed to be filled with said lubricating fluid.

5. The aircraft according to claim 4, characterized in that said casing comprises a zone for housing said valve and a fluidic passage fluidically interposed between said zone and said collection tank;
said at least one nozzle being configured to feed said lubricating fluid in said zone;
said plunger, when arranged in said first position, leaving said fluidic passage open and allowing said lubricating fluid to flow from said casing to said tank;
said plunger, when arranged in said second position, blocking said fluidic passage and keeping, in use, said lubricating fluid in said casing.

6. The aircraft according to claim 1 any one of the preceding claims, characterized in that it comprises a sensor designed to provide an indication associated with whether said valve is in said first or second configuration.

7. The aircraft according to claim 6, characterized in that said sensor is a pressure sensor or a pressure switch, and is configured to provide a signal associated with the pressure of said header, when said valve is in said first configuration.

8. The aircraft according to claim 7, characterized in that said shell comprises a fourth opening operatively connected to said sensor;
said sensor being configured to detect the pressure inside said first opening.

9. The aircraft according to claim 8, characterized in that said first opening is fluidically connected to said chamber when said plunger is in said first position, and is fluidically connected to said casing when said plunger is in said second position.

10. The aircraft according to claim 1, characterized in that it comprises:
at least one propulsion unit having a respective output member; and
at least one rotor operatively connected to said output member;
said rotor comprising a mast;
said transmission unit comprising:
a pair of first gears interposed between said output member and at least one intermediate shaft;
at least one pair of second gears interposed between said intermediate shaft and said mast;
said first module comprising respective said first gears;
said transmission unit further comprising a second module housing said train of second gears;
said feed header being common to said first and second modules; and/or
characterized in that it is a helicopter or a convertiplane.

11. A method of lubricating a module of a transmission unit of a hover-capable aircraft;
said module, in turn, comprising:
a casing; and
a movable member housed inside said casing;
said method comprising the steps of:
i) collecting said lubricating fluid in a feed header;
ii) feeding said lubricating fluid contained in said header inside said casing, so as to enable the lubrication of said movable member of said module; and
iii) recirculating said lubricating fluid conveyed inside said casing to said header;

iv) arranging a valve of said module in a first configuration, wherein said valve allows the recirculation of said lubricating fluid to said header when the pressure of said lubricating fluid inside said header is greater than a threshold value; and v) arranging said valve in a second configuration, wherein said valve prevents said recirculation and keeps said lubricating fluid inside said casing when the pressure of said lubricating fluid inside said feed header is less than a threshold value.

12. A hover-capable aircraft, comprising:

a motion transmission unit formed by at least a first module; and a lubrication system designed to lubricate said transmission unit;

said first module, in turn, comprising:

a casing; and one or more movable members housed inside said casing;

said lubrication system comprising:

a feed header of said lubricating fluid;

at least one nozzle fluidically feedable with said lubricating fluid from said feed header and designed to feed the lubricating fluid inside said casing of said first module so as to enable the lubrication of the relative said movable members;

a collection tank for said lubricating fluid injected by said nozzle; and recirculation means designed to cause the recirculation of said lubricating fluid of said collection tank to said feed header;

at least said first module comprising a valve available in a first configuration, wherein the outflow of said lubricating fluid from said module to said recirculation means is enabled when the pressure of said lubricating fluid inside said feed header is greater than a threshold value;

said valve being available in a second configuration, wherein it fluidically isolates said module from said recirculation means when the pressure of said lubricating fluid inside said feed header is less than said threshold value;

said aircraft further comprising:

a recovery pump having an inlet port fluidically connected to said casing and a discharge port;

said collection tank being fluidically isolated from said casing; and a fluid line extending between said valve and said casing;

said recirculation means comprising a delivery pump having an inlet port fluidically connected to said collection tank and a discharge port fluidically connected to said feed header;

said valve being interposed between said discharge port of said recovery pump and said collection tank;

said valve, when arranged in said first configuration, fluidically connecting said discharge port of said recovery pump to said collection tank, and fluidically isolating said discharge port of the recovery pump from said fluid line;

said valve, when arranged in said second configuration, fluidically connecting said discharge port to said fluid line, and fluidically isolating said discharge port from said collection tank;

characterized in that said fluid line is directly interposed between said valve and a nozzle of said module;

said valve being automatic and the movement of said valve between said first and second configurations is automatically determined by the value of said pressure inside said feed header;

said valve, in turn, comprising:

a shell;

a plunger sliding inside said shell between a first position and a second position corresponding to said first configuration and said second configuration, respectively;

elastic means interposed between said shell and said plunger and designed to elastically push said plunger towards said second position; and a chamber defined between said shell and said plunger, and fluidically connected to said feed header and configured so as to exert an action on said plunger opposite to the one exerted by said elastic means and directed, in use, towards said first position;

said valve further comprising:

a first opening fluidically connected to said fluid line;

a second opening fluidically connected to said discharge port of said recovery pump; and a third opening fluidically connected to said tank;

said plunger blocking said first opening and placing said second and third openings in fluidic communication with one another when it is arranged in said first position and said valve is arranged in said first configuration;

said plunger blocking said third opening and placing said first and second openings in fluidic communication with one another when it is arranged in said second position and said valve is arranged in said second configuration;

said aircraft further comprising a sensor designed to provide an indication associated with whether said valve is in said first or second configuration;

said sensor being a pressure sensor or a pressure switch, and is configured to provide a signal associated with the pressure of said header, when said valve is in said first configuration;

said shell comprising a fourth opening operatively connected to said sensor;

said sensor being configured to detect the pressure inside said first opening;

said plunger blocking, in use, said fourth opening when said valve is in either said first or second configuration;

said plunger leaving said fourth opening open and placing said fourth opening in fluidic communication with said header when said valve is in the other of said first or second configuration.

13. The aircraft according to claim 12, characterized in that said valve is arranged externally to said first module.

14. The aircraft according to claim 12, further comprising:

at least one propulsion unit having a respective output member; and at least one rotor operatively connected to said output member;

said rotor comprising a mast;

said transmission unit comprising:

a pair of first gears interposed between said output member and at least one intermediate shaft;

at least one pair of second gears interposed between said intermediate shaft and said mast;

said first module comprising respective said first gears;

said transmission unit further comprising a second module housing said train of second gears;

said feed header being common to said first and second modules; and/or characterized in that it is a helicopter or a convertiplane.

* * * * *